No. 609,015. Patented Aug. 16, 1898.
R. EICKEMEYER.
ELECTRIC ELEVATOR.
(Application filed Jan. 5, 1891.)
(No Model.) 2 Sheets—Sheet 1.
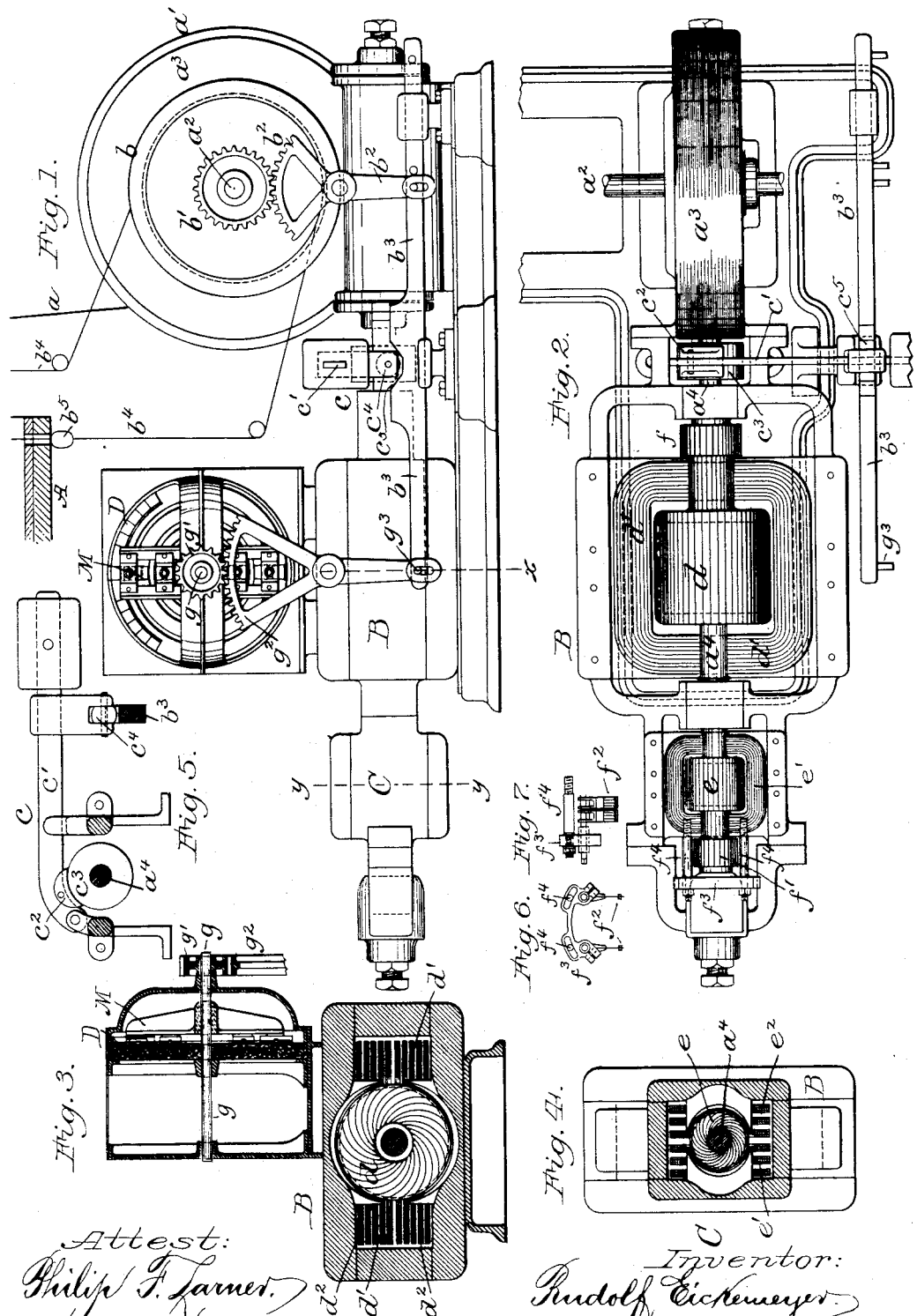

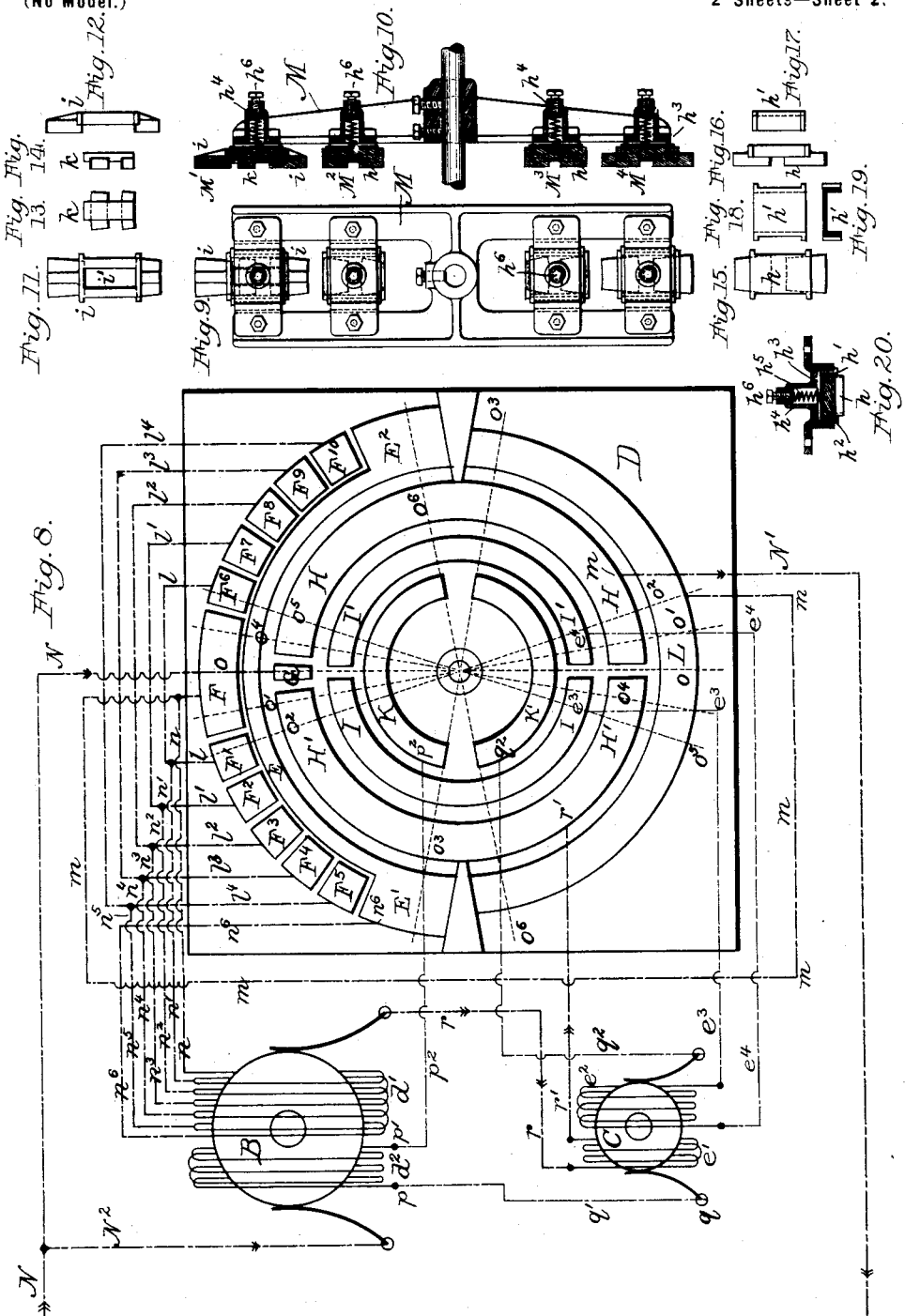

UNITED STATES PATENT OFFICE.

RUDOLF EICKEMEYER, OF YONKERS, NEW YORK.

ELECTRIC ELEVATOR.

SPECIFICATION forming part of Letters Patent No. 609,015, dated August 16, 1898.

Application filed January 5, 1891. Serial No. 376,740. (No model.)

*To all whom it may concern:*

Be it known that I, RUDOLF EICKEMEYER, of Yonkers, in the county of Westchester and State of New York, have invented certain new and useful Improvements in Electric Elevators; and I do hereby declare that the following specification, taken in connection with the drawings furnished and forming a part of the same, is a clear, true, and complete description of the several features of my invention.

In the operation of elevators, and especially for passenger-service, smooth and quite-rapid motion is demanded, with a corresponding capacity for promptly starting in either direction and stopping promptly, and also a practically uniform rate of speed, regardless of the constantly-varying conditions as to load on the car, which are incident to such service. These conditions and requirements necessarily involve the use of motors which are wholly under mechanical control by way of a line or rope accessible to an attendant in the elevator-car, so that the motor may with certainty be promptly started, stopped, and reversed. In driving elevator mechanism by means of electricity these prompt changes in the operation of a motor involve well-known difficulties, due in part to heretofore making and breaking of electric circuits and in part to other well-known and more or less complicated conditions.

I have heretofore devised certain improvements in electric elevators whereby electric motors may be operated under all conditions which are incident to elevators driven by steam-engines or hydraulic motors and with complete safety to the electric motor and with results at least as, and, I believe, more, satisfactory than those which are possible with the use of any other kind of motive power. My said prior improvements were duly disclosed in my application for Letters Patent filed May 14, 1890, Serial No. 351,753, Letters Patent No. 454,462, and, briefly stated, they involve the making and breaking and the reversal of electric circuits and means for so controlling the currents as to obviate sparking at the commutator and elsewhere, and the undue and dangerous charging of the circuits within the motor is rendered practically impossible. I have also in a later application, filed October 1, 1890, Serial No. 366,743, Letters Patent No. 541,200, disclosed means for securing a substantially uniform potential in the line-circuits, which furnish power for my said prior electric elevators.

I have now for the first time, as I believe, devised an electric elevating organization embodying a motor which may be started, stopped, and reversed without making or breaking electric circuits and which is self-regulating as against undue speed in either direction. In other words, I have for the first time provided for securing all of the requisite variations in the operation of electric motors by the use of constant currents and a system of short and full circuiting in the field-circuits of the motor, thus enabling the apparatus to be successfully employed in a constant-current circuit (wherein interruptions must be avoided) and obviate irregularities in the operation of other apparatus in the same circuit, and I have also provided for the self-regulation of the motor by means of an electric governor, which varies the driving power and speed of the motor according to its varied requirements and restrains its speed within certain readily-predetermined requirements by magnetic counter action in the magnetic field of the motor, and I have successfully organized these improvements with approved elevator mechanism.

As results of my invention there are no "kicks" in the motor-currents, all sparking is obviated at the commutators of the motor, and no resistances are required, and no mechanically-automatic operations need be involved aside from the desirable automatic control of the motive power by the elevator-car at the terminals of its route. My novel organization also contributes in the matter of special security as against results of unduly high speed, because if at any time the motor should exceed its proper limit as to speed while running in either direction it will cease to become a motor and then operate as a generator, and it will consequently then do duty as a self-acting brake, which will exert retarding force in exact proportion to the conditions which render braking action necessary or desirable.

After describing my several improvements as embodied in an elevator organization illustrated in the drawings such novel features as may be properly included within this application will be duly specified in the several clauses of claim hereunto annexed.

Referring to the drawings, Figure 1, Sheet 1, illustrates in side elevation so much of an elevator organization including my said improvements as is deemed necessary for the purposes of this specification, an elevator-car being partially indicated as if in its lowest position and the controlling-line and hoisting-cable being also indicated sufficiently for illustration. Fig. 2 illustrates the main portions of the same, partially in plan and partially in horizontal longitudinal section. Fig. 3 illustrates the electric motor in lateral vertical section on line $x$, Fig. 1. Fig. 4 illustrates the governor of the motor in lateral vertical section on line $y$, Fig. 1, said governor being a dynamo-electric machine. Fig. 5 illustrates the mechanical brake, partially in side view and with the adjacent parts in section. Figs. 6 and 7, in two views, illustrate such brushes as are employed at the commutators of the motor and the governor. Fig. 8, Sheet 2, is a diagrammatic illustration of the electric connections, the motor, and its governor, together with a front view of a novel switchboard, through which the short circuiting is effected. Figs. 9 and 10, in plan view and in longitudinal central section, illustrate a novel switch-bar which is employed on the switchboard. Figs. 11, 12, 13, and 14, in top and side views, illustrate the contact portions of one of the novel brushes or contact-plates on said switch-bar. Figs. 15, 16, 17, 18, and 19, in several views, illustrate in detail the brush at the other end of said bar, the two intermediate brushes differing therefrom only in the length of the contact-plates. Fig. 20 illustrates one of the brushes in lateral central vertical section and detached from the bar, and it is fairly applicable to all of the brushes.

The elevator-car A (of which only a part of its floor is shown) is hoisted and lowered by means of one or more cables $a$ and a coiling-drum $a'$ on a shaft $a^2$, reversely driven by a worm-gear in the housing $a^3$, and a driving or worm shaft $a^4$, to which power is applied. On said shaft $a^2$ a controlling-drum $b$ is loosely mounted, and it carries a pinion $b'$, which engages with the teeth of a pendent segmental lever $b^2$, slotted at its lower end and coupled by a pin to a sliding bar $b^3$. The controlling-drum $b$ is encircled by an endless hand line or rope $b^4$, which passes upwardly over a sheave at the top of the elevator-shaft and down through the elevator-car, and it has at proper points thereon two stop-blocks, the lower one of which is shown at $b^5$, so that, as usual, when the elevator-car reaches either end of its route the sliding bar $b^3$ will be so moved as to apply brakes and operate the electric-current-controlling devices.

The brake $c$ embodies a weighted lever $c'$ and a shoe $c^2$ near its fulcrum, which normally bears upon the surface of a brake-hub $c^3$ on the driving or worm shaft $a^4$. Near the outer end of the weighted lever $c'$ there is a friction-roller $c^4$ on a stud, and when the machine is at rest said roller occupies a recess $c^5$, centrally located in the upper edge of the sliding bar $b^3$; but said roller does not then rest on said bar, and hence the brake-shoe is then in full braking contact with the brake-hub $c^3$. The recess $c^5$ has beveled sides, as clearly indicated, so that when the bar $b^3$ is moved in either direction it can readily lift the brake-lever and as readily drop it when moved in either direction to its central or normal position.

As thus far described, the several parts and their coöperative arrangement correspond with a well-known and highly-approved type of elevators; but my present improvements are in whole or in part applicable to other types of elevator hoisting or operating mechanism. The organization with the outer end of the mechanically-operated sliding bar of electric controlling devices is novel with me, and it involves certain improvements which, broadly considered, were disclosed in my aforesaid application for Letters Patent.

The electric motor B has its armature carried on the driving-shaft $a^4$, and as here shown it is one which embodies many features heretofore devised by me and disclosed in Letters Patent. The best results will accrue from the use of this particular type of motor, because of the fact that the core of the armature $d$ is directly polarized by a field coil or coils $d'$, which are inclosed within a shell or casing of magnetic metal; but the novel features of my present invention do not depend for value upon their use with any special form of motor, especially if it be provided with field-coils which are to such a degree sectional or composite as will permit of variations in the magnetic field according to how many field-sections may be in circuit and, still further, so organized that one or more of said sections may be employed as essential portions of the motor-governing appliances or, in other words, serve as a "governing-coil" $d^2$ for reducing the magnetization developed by the true field-coil.

The governor C is driven mechanically by the motor, and it is a dynamo-electric machine having an armature $e$ and two sets of field-coils $e' e^2$, and as here shown it is of the same general type as the motor, but it may be of any other well-known variety, provided it has coils which are capable of exciting appropriate magnetism in the field. The armature $e$ is, like the motor-armature, carried on the driving-shaft $a^4$, and hence both armatures rotate in harmony. In a preliminary way I will now state that in the armature-circuit of the motor the current is always in one direction. In the field-coil $d'$ of the motor the currents are reversed, according to the direction in which the motor may be driven. Whatever current there may be from time to time in the governing-coil is reversible, but always in a direction opposite to that which for the time being may be traversing the true field-coil. In the governor field-coils $e'$ and $e^2$ the current is never reversed; but the armature on being reversibly driven by the motor develops opposite currents in the armature-circuit of the governor, thus providing for reversal of current in the governing-coil $d^2$ of the motor, and although the governor furnishes this reversed current to the governing-coil it also furnishes for one of its field-coils a current which is always in one direction in said coil.

The commutator-hubs $f$ of the motor and $f'$ of the governor-dynamo are engaged by carbon spring-brushes $f^2$ of the character disclosed in my Letters Patent No. 397,492, said brushes being carried in a pendent position by carriers $f^3$, which are supported on suitable bolts $f^4$, projecting from the frame of the machine.

The current-controlling or short and full circuiting switchboard D is traversed by a set of contact plates or brushes carried on a switch-bar M. This bar is mounted on a rock-shaft $g$, and the whole is usually mounted on the motor B. At the outer end of the rock-shaft $g$ there is a pinion $g'$, which is meshed by the teeth of a segmental gear-lever $g^2$, slotted at its lower end for the reception of a pin $g^3$, projecting laterally from near the outer end of the mechanically-operated sliding bar $b^3$. Inasmuch as the entire electric organization is controllable by way of this swinging switch-bar it will be readily seen that an attendant in the elevator-car by manipulating the hand line or rope $b^4$ can control the entire organization and that the motor will also be controlled automatically by the elevator-car and the stop-blocks, as at $b^5$, on the controlling-line $b^4$.

Now referring to Figs. 8 to 20, inclusive, I will first briefly describe the construction of the short-circuiting or current-controlling board D and the coöperating switch-bar M.

In Fig. 8 the circularly-arranged contact-blocks in a general way resemble certain prior switchboards provided with centrally-pivoted swinging switch-bars; but this board radically differs from any other known to me in that the blocks in each two of the four circular lines are paired with each other—as, for instance, the blocks in the outer line are paired with the blocks in the next interior line and the blocks of the two inner lines are paired with each other—that is to say, these lines of blocks which I have called "paired" are intimately related as to electric circuits, and therefore short contact plates or brushes are needed. At the upper side of the board the outer upper line of blocks is complex in its character in that the block E occupies about one-half of the circle, its two ends, as at E' E², being of considerable width, and the intervening curved portion is quite narrow and affords space for the reception of a circularly-arranged series of small blocks, which are insulated from each other and from the block E. These small blocks I will term "field-blocks," because they are each coupled with an appropriate section of the field-coil of the motor.

The central field-block F is longer than the others, and it is not only in connection with the motor-field, but it also serves as a terminal block for a conductor, which is always traversed by a current in one direction or another, as will be hereinafter more fully explained. The several blocks at the left-hand side of block F at F', F², F³, F⁴, and F⁵ are progressively traversed by the brush-bar in starting the motor in one direction, and the blocks F⁶, F⁷, F⁸, F⁹, and F¹⁰ are similarly traversed in starting the motor in the opposite direction.

Below the central field-block F there is a small terminal block G, with which one end of the line-wire N connects, and said block centrally occupies a gap between the ends of a pair of semicircular blocks H and H', constituting the second circular line of blocks. The block H is also a terminal block, with the lower end of which the end of the other line-wire N' is connected. The third line of blocks includes but two, as at I and I', both semi-circular and separated by gaps at their ends in a vertical line below the terminal block G. The fourth line of blocks also includes but two, as at $k$ and $k'$, which I will term "governor-blocks," because they are each connected with the governing-circuits. These governor-blocks are also each semicircular, and they are separated by gaps located on a horizontal line at right angles to the gaps in the two next outer lines of blocks. The lower half of the outer line includes but one block, L, semi-circular in form, and this is in constant communication with the block F by way of a conductor at $m$.

The electric coupling of the blocks E with the F series and H and H', and blocks I and I' to K K', and the block L with blocks H and H' will obviously involve the use of short sliding bridge-shaped contact-plates or coupling-brushes.

Referring now to Figs. 9 and 10, it will be seen that the switch-bar M carries four of these coupling contacts or brushes, (designated at M', M², M³, and M⁴,) the three latter being substantially alike in structure, the brush M⁴ having, however, somewhat longer contact-plates than the others. Their structure is fully indicated in Figs. 15 to 20. The brush contact-plate $h$ has two bearings or faces, and it is snugly inclosed at its top and two edges by an insulating-shell $h'$, which is fitted so that it may slide vertically in a recess $h^2$ at the under side of a frame-piece $h^3$, having a central vertical hollow stem $h^4$ on its upper side, a spring $h^5$, which is within said stem and bears upon the top of the insulating-shell and is in turn engaged by an adjusting-screw $h^6$, which is tapped into the top of the stem, and hence it can variably bear upon the top of the spring. It will be seen that the contact-plates have an extensive face area, and that they will be held under firm contact with the surfaces of their respective blocks, and be readily adjustable as to their bearing force, as well as free to a certain degree of self-adjustment in the matter of maintaining parallelism with the faces of the blocks. The brush M' is a little more complex in its structure, but it has a contact-plate $i$ which is similar to the plates $h$, and shown in Figs. 10 and 11; but this is slotted longitudinally, as at $i'$, for the reception of the back portion of a small auxiliary contact-plate $k$. (Shown in top and edge views in Figs. 13 and 14.) The outer face of the plate $i$ of this brush engages specially with the F series of blocks, and the outer face of the auxiliary plate $k$ engages specially with the narrow central portion of the block E, and both of said outer ends engage with the wide portions or ends E' and $E^2$ of said block E. The inner faces of the plates $i$ and $k$ engage in common with the terminal contact-block G and the blocks H and H'.

I will now describe the electric conducting-wires and their connections with the blocks on the board. The line-wire N, I will call the "incoming" wire, which is coupled to the terminal block G, and the line-wire N', I will call the "outgoing" wire, which is coupled to the lower portion of the other terminal block H. The motor B, as shown in Fig. 8, has a field-coil $d'$, which is divisible into five sections. In Fig. 8 only five sections are shown in the field-coil $d'$ and three sections in the governing-coil $d^2$; but in Fig. 3 ten sections are shown. It will be understood that all of said sections may be in like manner employed; but for the purposes of this specification we may assume any number of sections in each of the two coils, the governing-coil being preferably smaller than the true field-coil and the blocks of the F series being proportioned in number to the number of subdivisions of the true field-coil, whatever that may be. The blocks F' and $F^6$ are electrically coupled by the wire $l$, block $F^2$ with block $F^7$ by similar wire $l'$, block $F^3$ with block $F^6$ by wire $l^2$, block $F^4$ to block $F^9$ by wire $l^3$, and blocks $F^5$ and $F^{10}$ by wire $l^4$. The central block F is electrically coupled, as before stated, by a wire $m$ with the central portion of the block L. The first or right-hand section of the motor field-coil is coupled at one end to the wire $m$ by the wire $n$. Wire $n'$ in like manner connects the other end of said section with the wire $l$, and consequently connects said section with blocks F' and $F^6$. The second section of the field-coil $d'$ is connected by wire $n^2$ with wire $l'$ of blocks $F^2$ and $F^7$, and so on throughout the five sections by way of the wires $n^4$ $n^5$ for similarly coupling with the other blocks of the F series; but the left-hand section or terminal of the field-coil is connected by wire $n^6$ at E' with the left-hand end of block E. It is obvious, however, that for securing the best results the possible speed of the motor should be restricted as nearly as may be practicable to that which will afford an approved speed of the elevator-car. I have devised various modes and means for automatically governing the speed of the motor independently of the switchboard and its bar; but in the present organization I rely upon counter-magnetization of the field-coil of the motor, and I rely for this service upon the dynamo-electric governor C, before referred to.

The counter-magnetization of the motor-field, as before stated, involves the use in the motor of the second coil $d^2$, and this may be in a number of sections (counterparts of the true field-coils $d'$) coupled in series, as indicated.

The demagnetizing or motor governing coil $d^2$ has one of its terminals $p$ connected with one of the governor-brushes at $q$ by way of wire $q'$, the circuit passing through the governor armature-coil to the conductor $q^2$ and thence to the interior line-block $k'$, and the other terminal $p'$ of the governing-coil $d^2$ is connected by the conductor $p^2$ with the other interior line-block K.

The two field-coils $e'$ and $e^2$ in the magnetic field of the governor C operate harmoniously with each other with respect of magnetization. The coil $e'$ has one of its terminals connected by way of wire $r$ with one brush of the motor B, and the other terminal of said coil is coupled by way of wire $r'$ with the contact-block H'. The second governor-coil $e^2$ is coupled at one of its terminals with block I by way of wire $e^3$ and at its other terminal by wire $e^4$ with block I'.

The several electrical connections having been described, I will now assume that the switchboard is without any switch-bar, in order to indicate electrical saturation throughout the electric-motor organization. The line-wire N between its junction with the shunt-wire $N^2$ and the block G is electrically charged, and so also is the shunt-wire $N^2$, the armature-circuit of the motor B, and one coil $e'$ of the governor C, and also the block H', and in this portion of the electric system no reversals occur, and the electric conditions therein are only varied when this described circuit is short-circuited or full-circuited by way of the appropriate contact-blocks and their brushes. I will next assume that the brush-bar is in place and having only the brushes M' and $M^4$ therein and that the bar occupies its normal position at $o$. In such case the motor armature-circuit and the several connections therewith before described will be short-circuited and current from N will pass from block G and brush M' to block F, thence by conductor $m$ to L, and thence by brush $M^4$ to H and out by line-wire N'. This brush $M^4$ also then overlaps upon block H', and this completes the circuit between the armature-circuit of the motor and the field-coil $e'$ of the governor to line N'. Next assuming that the brushes $M^2$ and $M^3$ are in service and the bar M in position at line $o$, it is obvious that blocks K and K' will be connected to blocks I and I', thus completing the reversible governor armature-circuit, which specially includes the governing-coil $d^2$ of the motor, by way of conductors $p^2$ and $q^2$, and also completing the non-reversible shunt-circuit from the governor-armature through the governor field-coil $e^2$ and the conductors $e^3$ and $e^4$, which respectively connect with the blocks I and I'; but when the bar is in this position $o$ the motor and the governor are at rest, and hence the electrical condition of the governor is then immaterial so long as the condition may be varied by moving the switch-bar, so that although the governor may develop a current in either direction for use in the motor governing-coil $d^2$ it will deliver its current in its own field-coil $e^2$ always in one direction.

As the duty of the governor is to develop counteracting magnetization in the motor-field, the normal generating capacity of the governor should be initially regulated or predetermined with respect of the required speed of the motor by having the line-current field-coil $e'$ in the governor of such small dimensions as to afford a comparatively inefficient magnetic field in the governor when the motor is running at proper speed; but when that speed is exceeded and the governor-armature is therefore unduly speeded its generating capacity will be increased and it will at once, through its own field-coil $e^2$, increase its generating power, and continue to do so until the counteracting effect of the governing-coil $d^2$ in the motor causes the latter to slow down and to at once proportionately decrease the generating capacity of the governor until normal speed has been resumed.

The effective value in an electric-elevator organization of this system of governing does not depend upon the use of a motor in which reversals of current are employed in the field-coils; but if the reversals be made in the armature-circuit the current in the governing-coil will not be reversed, and the switching mechanism for the governor would then be so modified in the way of connections as to provide for a non-reversed current in the governing-coil, substantially as I have provided for a non-reversed current in the governor-field-coil circuit $e^2$ $e^3$ $e^4$, notwithstanding the reversal of current incident to oppositely driving the governor-armature.

In the operation of my elevator I will assume that the governor has operated to balance the magnetization of the field-coils and that the motor has been thereby deprived of power and that thereafter the load carried by the elevator was sufficient to still drive the armature of the motor above its normal speed. In such case the motor would promptly become a generator and develop an opposing current in the line-circuit, thus enabling the motor to exercise a self-braking effect in retarding the descent of the elevator-car.

As before stated, with the several parts in the condition indicated and the switch-bar M in position $o$ the motor will be at rest. Now for starting the motor in one direction the switch-bar M has its upper end swung toward the left hand, and on reaching the position indicated at dotted line $o'$ communication will be terminated with the block G and the motor will cease to be short-circuited by line-wire N, whereupon the current will pass by way of the shunt line-wire $N^2$ through the armature-circuit of the motor B, thence by wire $r$ through field-coil $e'$ in the governor and by wire $r'$ to block H', thence by brush M' to block F, along conducting-wire $m$ down to block L, and thence by brush $M^4$ to H and out by line-wire N'. When the brush-bar M reaches the position indicated at $o^2$, the conditions at the brush $M^4$ will remain the same; but at brush M' the current from block H', as before, will pass to block F', and thence by wire $n'$, through one section of the field-coil $d'$ of the motor, back by wire $n$ to $m$ and thence to L and out, as before described. As the brush-bar is further moved it progressively ceases to short-circuit the field-coil sections in the motor until all are in full or complete circuit, the current then passing from block H' to the end E' of block E, to the field-coil by way of wire $n^6$, and thence by wire $n$ to wire $m$ and out, as before, the motor-field then receiving full current from the line.

The operation of the motor mechanically drives the armature of the governor; but the governor-coils $e'$ and $e^2$ are so proportioned and adjusted that, as before indicated, no appreciable current will be generated in its armature-circuit until from and after the time the motor shall begin to run beyond the predetermined speed, and then the governor commences to generate an effective current, which by exciting the governing-coil $d^2$ in the motor will cause it to counteract or so far balance the magnetizing power of the motor field-coils $d'$ as to promptly reduce the speed of the motor, and the current so generated will also be meantime passing through the coil $e^2$ of the governor and increasing its controlling power in the magnetic system of the motor in exact proportion to variable requirements. Now for stopping the motor the switch-bar M will be moved back to its normal position, and on its way it will progressively short-circuit first the field-coil of the motor and finally the armature. Next for reversing the motor the switch-bar will have its upper end moved toward the right hand from the position $o$, and on reaching the position $o^4$ the motor will be relieved from short-circuit and the current will pass through its armature to H', as before, and in the same direction, and thence to L by way of brush $M^4$, thence by wire $m$ to block F, thence by brush M' to block H and out by line-wire N'. When the bar reaches the position $o^5$, the relations between block H' L, brush $M^4$, and wire $m$ will remain the same; but current will then flow from $m$ through wire $n$, through the right-hand section of the motor field-coil, (but in an opposite direction from that first described,) back by wire $n'$ to wire $l$ to block $F^6$, and thence by brush $M'$ to $H$ and out by line-wire $N'$. The bar $M$ moving farther in the same direction will progressively and in like manner remove the short-circuit from all of the motor field-coils, and when the bar $M$ reaches the position $o^6$ the current from block $H'$ and wire $m$ passes by way of wire $n^6$ from the motor-coil to the end $E'$ of block $E$, thence to its opposite end $E^2$ through brush $M$ to block $H$ and out by line-wire $N'$, the motor then operating under full power from the line, but in an opposite direction from that first described. The governor being reversely driven mechanically then develops the required opposite or counteracting current in the motor governing-coil $d^2$ without reversing the current in its own exciting-coil $e^2$, and in this connection the governor-circuit will now be more fully described.

If the brush-bar $M$ be located on line $o^3$, the blocks $K$ and $I$ will be coupled by the brush $M^2$, thus connecting wires $p^2$ and $e^3$, while the brush $M^3$ will couple the blocks $K'$ and $I'$, thus connecting the wires $q^2$ and $e^4$ and completing the entire governor-circuit. When the brush-bar is located on line $o^6$, then the blocks $K'$ and $I$ are coupled, thus connecting the wires $q^2$ and $e^3$, the brush $M^3$ then coupling the blocks $I'$ and $K$, thus connecting wires $p^2$ and $e^4$ and completing the circuit for the then reversed currents in the governing-coil $d^2$ without changing the current in the motor field-coil $e^2$.

It will be seen that both divisions of the motor-circuit are fully protected against such injuries as are incident to electric motors generally and are liable in all wherein the electric circuits are completely made and broken for starting and stopping and that my said improvements are in part as applicable to electrically-driven endless chain or belt elevators as to those which involve the use of hoisting or drum mechanism and cables; but it is with the latter class of elevators that my improvements have their prime value, because of the non-liability of kicks in the motor-circuits and the absolute freedom from sparking at the movable current-controlling plates during the reversal of the field-circuit. I also obviate all necessity for resistance contrivances, not only resulting in economy in structure and maintenance, but avoiding many more or less objectionable features incident to their use.

I have also provided for a complete automatic control of the speed of the elevator beyond that which may be proper or required, and it will be seen that if at any time the motor should be driven beyond that speed in either direction it will then operate (for instance, as is possible with some elevators by the too rapid descent of the car) as a generator, and so as to then serve as a brake for retarding the descent of a car. It will also be seen that when one of my elevators is located in a commercial electric circuit that the potential in the latter cannot be varied by the starting, stopping, and reversing operations, because at no time can any portion of the motor circuit or circuits be so varied as to vary the potential of the line.

It will be obvious that certain good results will accrue from the use of a portion of my invention even if the motor should have its armature-circuit switched wholly in and out of the line-circuit, provided the field-coils were constructed and operated as hereinbefore described. It will be equally obvious that in certain types of motors embodying outside iron cores and field-coils of tubular form said coils may be as readily divisible into sections for coöperating with the governor as the particular form of sectional coils, which I have illustrated and described.

Having thus described my invention, what I claim is—

1. The combination substantially as hereinbefore described, of an elevator, and its hoisting mechanism, a reversible electric motor coupled thereto, and provided with a system of field-coils, and one or more governing-coils, and means for supplying said governing-coils, with independent electric currents opposite in direction to those carried by the field-coils, and means for furnishing to said governing-coils, currents which are effective only when the motor, and elevator, are moving too rapidly.

2. The combination substantially as hereinbefore described, of an elevator, and its hoisting mechanism; an electric motor coupled thereto, and a dynamo-electric governor mechanically driven by said motor, for generating electricity, and distributing it in the magnetic field of the motor, and weakening said field, in proportion to any increase of speed in the elevator, beyond its desired, or predetermined rate.

3. The combination substantially as hereinbefore described, of an elevator and its hoisting mechanism; an electric motor coupled thereto, and provided with field-coils, and a governing-coil; a dynamo-electric governor, mechanically driven by said motor, for supplying counteracting currents to said governing-coil, and means for appropriately reversing currents in the operative circuit of the motor, and also in said governing-coil, and maintaining a non-reversed current in the field-coil of the governor.

4. The combination substantially as hereinbefore described, of an elevator and its hoisting and braking mechanism; an electric motor coupled thereto, and having a non-reversible armature-circuit; a reversible field-coil circuit; and a reversible governing-coil circuit; automatic means for varying the current in the governing-circuit, in proportion to the speed of the motor, and a current-controlling device, mechanically connected with the braking mechanism, and operated by a controlling-line, accessible within the elevator-car, for appropriately controlling the several electric circuits, and the braking mechanism.

5. The combination substantially as hereinbefore described, of an elevator and its hoisting mechanism; an electric motor coupled thereto; a dynamo-electric governor mechanically driven by said motor; separate motor-circuits, and governor-circuits, and a mechanically-operated switching device, for appropriately controlling both of said circuits, and a controlling-line, accessible within the elevator-car, and operatively connected with said switching device.

6. The combination substantially as hereinbefore described, of an elevator and its hoisting mechanism, and an electric motor coupled thereto, provided with field-coils, adapted to reversals of current, for reversely driving the motor, and also provided with a governing-coil, fed with currents for neutralizing the magnetization of the field-coils, in proportion to undue speed of the motor, whereby should the motor be operated above its normal speed after said governing-coil has balanced the field-coils, the motor will then operate as a generator and develop in its field-coils, a counteracting current, and enable the motor to then operate with self-braking effect, in retarding the speed of the motor-armature, and of the elevator mechanism directly coupled thereto.

RUDOLF EICKEMEYER.

Witnesses:
JAMES E. IRVINE,
HENRY OSTERHELD.